Patented May 4, 1954

2,677,674

UNITED STATES PATENT OFFICE 2,677,674

BLENDS OF (1) COPOLYMERS OF STYRENE WITH SMALL AMOUNTS OF DIVINYLBENZENE, (2) HIGH STYRENE-LOW BUTADIENE RESINOUS COPOLYMERS, AND (3) RUBBERY COPOLYMERS OF 35–60 PER CENT BUTADIENE AND 65–40 PER CENT STYRENE

Lawrence E. Daly, Mishawaka, Ind., assignor to United States Rubber Company, New York, N. Y., a corporation of New Jersey No Drawing. Application February 13, 1953,
Serial No. 336,883

3 Claims. (Cl. 260—45.5)

This invention relates to rubber-resin blends exhibiting toughness, i. e., high impact-resistance, improved processing properties and high resistance to ultraviolet light.

The principal object of my invention is to provide a tough, thermoplastic resin-rubber composition which combines the advantages of low cost, ability to be smoothly calendered into sheets having such surface smoothness that they can be sold directly to the user without further operation to render the surface smooth, and high resistance to ultraviolet light. Many other objects and advantages of my invention will be apparent from the following description.

My invention is based upon the discovery that the foregoing objectives can be attained in a simple and commercially feasible manner by providing a new composition of matter composed essentially of a blend, that is, a homogeneous mixture, of from 40 to 50% of cross-linked polystyrene resin, from 25 to 30% of a resinous copolymer containing from 73 to 95% of combined styrene and from 22 to 5% of combined butadiene, and from 25 to 35% of a rubbery copolymer comprising from 35 to 60% of combined butadiene and from 65 to 40% of combined styrene. The percentages of cross-linked polystyrene resin, resinous styrene-butadiene copolymer and rubbery butadiene-styrene copolymer are by weight based on the sum of these three ingredients and total 100%.

The cross-linked polystyrene resin component used in the practice of my invention is made by emulsion polymerization of monomeric styrene in the presence of from 0.01 to 2.0% by weight based upon the monomeric styrene of a cross-linking bifunctional monomer, almost invariably divinylbenzene. The cross-linked polystyrene is a "gelled" material which is insoluble in benzene although it is swellable by benzene to give a cloudy suspension. It is estimated to have a molecular weight within the range of from 40,000 to 500,000 and more commonly from 80,000 to 200,000. A typical method of making a cross-linked polystyrene resin suitable for use in my invention is as follows:

RECIPE

| | Parts by weight |
|---|---|
| Styrene | 100 |
| Divinylbenzene | 0.10 |
| $K_2S_2O_8$ | 0.05 |
| Aerosol AY (diamyl sodium sulfosuccinate) | 5 |
| Water | 200 |

The foregoing recipe is subjected to polymerization at a temperature of 50° C. for a time of 18 hours. This gives a conversion of 93%. The resulting latex is then coagulated and the coagulum is washed and dried in the usual way. The resulting resinous polymer has an apparent intrinsic viscosity (measured in benzene) of 0.68. This intrinsic viscosity is termed "apparent" because it is an indication of the degree of cross-linking and is not a true measure of actual molecular weight for the reason that the polymer is not truly soluble in the benzene used as carrying medium but is only swollen thereby, giving a cloudy "solution" therein. Such a polymer is only partially cross-linked and is not what those skilled in the art would characterize as "tightly cross-linked" because it is swellable by benzene although it does not truly dissolve therein. If it were tightly cross-linked it would be completely unswellable by benzene.

The styrene-butadiene resinous copolymer used in the practice of my invention is likewise made by emulsion polymerization. It can be either an un-cross-linked (i. e., soluble in benzol) material made without the use of divinylbenzene or other cross-linking agent in the polymerization or it can be a copolymer of styrene and butadiene cross-linked during polymerization with divinylbenzene or like cross-linking agent in amounts of from 0.01 to 2.0% by weight based on the monomers. Preferably it has an ASTM heat distortion temperature (measured at 264 p. s. i.) of at least 140° F. An example of such a copolymer is that known commercially as "Darex Copolymer X-34" which is high styrene-low butadiene copolymer resin, believed to be moderately cross-linked with divinylbenzene, having an ASTM heat distortion temperature (264 p. s. i.) of 146° F., which by analysis was found to contain 78% of bound styrene, the balance being butadiene, to contain 28% of benzene-insoluble gel of a type so loose that its tightness could not be measured, and to have an intrinsic viscosity (in benzene) of 1.08. Present-day analytical methods will not detect the small amount of combined divinylbenzene believed to be used as cross-linker. Another such copolymer is that known as "Kralac 1104 AEP" which was found by analysis to contain 78% of bound styrene and 22% bound butadiene, to contain 57% of benzol-insoluble gel (again the gel was so loose that its tightness could not be measured) and an intrinsic viscosity (in benzene) of 0.63; the latter copolymer is cross-linked during emulsion polymerization with 0.5% of divinyl-benzene, and it appears that the former copolymer is similarly cross-linked though to a considerably less extent.

The rubbery butadiene-styrene copolymer component of the mixtures of my invention is likewise made by emulsion polymerization of monomeric butadiene and styrene in such proportions and under such polymerization conditions that the resulting rubbery copolymer contains these monomers combined in the proportions indicated above.

Such rubbery copolymers of butadiene and styrene are intermediate between standard GR–S which usually contains around 25% bound styrene, the balance being butadiene, and the high styrene-low butadiene resinous copolymers which typically contain 80-95% of bound styrene, the balance again being butadiene. The rubbery copolymers comprising 35-60% butadiene and 65-40% styrene used in the present invention are flexible but somewhat stiffer than standard GR–S; they fuse at a relatively low temperature; they have a brittle point around 0° C. and therefore would not be suitable for the manufacture of articles, like tires, which must be flexible at low temperature; at room temperature they are "leathery" and pliable and do not shatter when struck; they elongate if subjected to a strong pull but exhibit rather slow recovery to original length; they do not exhibit the hard, horny nature of the truly resinous copolymers of styrene and butadiene; they can be said to occupy a "twilight zone" between standard GR–S and the resinous styrene-butadiene copolymers.

In the preferred practice of my invention, I use two different types of rubbery copolymer of butadiene and styrene, one being un-cross-linked, i. e., soluble in benzene, and the other being cross-linked, i. e., gelled and partially insoluble in benzene, the gel content being swellable and dispersible in benzene but not truly soluble therein.

The cross-linked rubbery copolymer of butadiene and styrene is made by performing the emulsion polymerization of the butadiene and styrene monomers in the presence of a small amount of a bifunctional monomer, again almost invariably divinylbenzene. Typically, the amount of divinylbenzene so employed will be approximately 0.3% by weight based on the sum of monomeric butadiene and styrene charged. However, the amount of cross-linking agent can range from 0.01 to 2.0% of these monomers.

Typical methods of making un-cross-linked or soluble and cross-linked or gelled rubbery butadiene-styrene copolymers suitable for use in my invention are as follows:

RECIPE

|  | Un-Cross-Linked Copolymer, Parts by Weight | Cross-Linked Copolymer, Parts by Weight |
|---|---|---|
| Butadiene | 30 | 30 |
| Styrene | 70 | 70 |
| Divinylbenzene | | 0.30 |
| Mixed tertiary $C_{12}$, $C_{14}$ and $C_{16}$ alkyl mercaptans | 0.30 | 0.30 |
| Silica-Free Soap Flakes | 5 | 5 |
| Water | 180 | 180 |
| Conditions of Polymerization: | | |
| Temperature, ° C | 50 | 50 |
| Time, hours | 4 | 6 |
| Conversion, Percent | 77 | 82 |

At the end of the indicated polymerization time, 0.2 part of the dimethylammonium salt of dimethyl dithiocarbamate is added to each latex as a "short-stopping agent," after which one part of "Deenax" (2,6-di-tertiary butyl para-cresol) is added as a stabilizer and antioxidant. The latex is then coagulated and the coagulum is washed and dried. The resulting copolymers have the following properties:

|  | Un-Cross-Linked Copolymer | Cross-Linked Copolymer |
|---|---|---|
| Mooney Viscosity (Large Rotor—4 minutes at 212° F.) | 34 | 42 |
| Combined Styrene Content, percent | 61 | 60 |

In the preferred practice of my invention, I employ from 40 to 60% of the un-cross-linked rubbery butadiene-styrene copolymer described above and from 60 to 40% of the cross-linked rubbery butadiene-styrene copolymer. These percentages are by weight based upon the sum of these two components.

The new compositions of my invention are thermoplastic but they have an adequately high heat distortion temperature. Thus, they have a heat distortion temperature by the ASTM test (measured at 264 p. s. i.) of at least 150° F. and typically at least 160° F.

My new compositions have much higher impact resistance than polystyrene resins. Thin sheets of the mixtures of my invention are not brittle. My compositions can be produced on conventional heated rubber mixing equipment (open rubber mills, Banbury mixers, calenders, extruders, etc.). The compositions of my invention are particularly noteworthy because they calender smoothly to give sheets which commonly have a thickness of from 0.010 to 0.080 inch and which are ideally adapted to be directly (without requiring any smoothening treatment) formed or molded, as by drawing, into useful objects.

Such calender smoothness cannot be obtained with polystyrene resins or with blends of polystyrene resins and conventional types of butadiene-styrene rubbery copolymer (GR–S), acrylate rubber, or other commercially available elastomeric materials. Polystyrene resins and such blends thereof are all quite rough and brittle.

Sheets of the calendered composition of my invention can be drawn into objects of commercial value using inexpensive wood or metal molds, by any known drawing method, e. g., the vacuum, or the ring and plug technique. Objects molded in this manner not only have high impact strength but also are resistant to ultraviolet light discoloration. Embossed sheets of my new compositions can be produced by passing the material through heated embossing calender rolls having various designs cut into the rolls. Heated platen presses and embossing plates can also be used to obtain embossed or leather grain effects. Calendered or extruded plies of my compositions can be easily welded together in heated platen presses at moderate pressures, typically around 100 p. s. i., to obtain sheets of various thickness. Useful molded articles can be produced from my compositions by making such compositions into the form of granular molding powder and molding in conventional injection or compression molding machines. My compositions exhibit excellent "flow" properties so that they are easily formed into strong, integrally bonded, commercially acceptable articles using conventional molding techniques.

My compositions are usually made by intimately mixing the several components thereof together to form a uniform homogeneous mixture in any suitable way, as on an open rubber mill or in a Banbury mixer, after which the resulting mixture is then either calendered to form sheets or converted to granular form for use in injection or compression molding. Alternatively, the intimate mixture can be extruded and cut off to form molding pellets.

Any desired filler or color pigment can be intimately incorporated with the compositions of my invention to produce any desired color. Marbleized effects can be obtained by mixing colored batches of the compositions together. Pellets of various colors can be mixed either to obtain marbleized injection molded items such as wall tile. The total amount of filler will usually range from 1 to 100 parts per 100 parts of cross-linked polystyrene, high styrene-low butadiene resinous copolymer and butadiene-styrene rubbery copolymer.

Other materials, e. g., additional "Deenax" to make up for loss of this rubber antioxidant by water-leaching during manufacture of the rubbery butadiene-styrene copolymer or copolymers, can also be incorporated in the mixture.

Thin sheets of my compositions can be adhered to various types of inexpensive wall boards, for example, by simply using a suitable adhesive or by pressing the sheet of my composition against the wall board while applying a suitable degree of heat. In this way acid and alkali-resistant tile board can be obtained.

The following examples illustrate my invention more fully. All parts are by weight.

*Example I*

| | |
|---|---:|
| Cross-linked polystyrene resin (made as described in detail above) | 42.50 |
| Styrene/butadiene resin ("Darex copolymer X-34"—about 78% bound styrene—ASTM heat distortion (264 p. s. i.) temp. 146° F.) | 25.50 |
| Un-cross-linked butadiene/styrene rubbery copolymer (39/61 ratio—made as described in detail above) | 16.00 |
| Cross-linked butadiene/styrene rubbery copolymer (40/60 ratio polymerized in the presence of divinylbenzene—made as described in detail above) | 16.00 |
| Total | 100.00 |

The foregoing ingredients were intimately commingled on an open rubber mill. The resulting mixture was calendered into a sheet 0.060" thick. The resulting material had the following physical properties compared to a similar calendered sheet made from commercial so-called high-impact polystyrene:

| | Material of Example I | High Impact Polystyrene Resin, Commercial Grade |
|---|---|---|
| Tensile Strength (p. s. i) | 3,800 | 5,200. |
| Elongation (Percent) (ASTM-D-638-46T) | 33 | 13. |
| Heat Distortion Temp., ° F. (ASTM-D-785-44T) | 160 | 175. |
| Izod Notched Impact (ASTM-D-256-43T) | 3.75 | 1.10. |
| Calendered Sheet (0.060 inch thickness) | Very Smooth, Flexible. | Very Rough, Brittle. |
| Ultraviolet light ageing (24 hours) | No Discoloration. | No Discoloration. |
| Specific Gravity | 1.14 | 1.07. |
| Rockwell Hardness, "R" Scale | 80 | 90. |

The data demonstrates that my new composition inexpensively produces a tough, flexible, very smooth calendered sheet. The commercial high impact styrene resin sheet, made by calendering in the same manner was rough and brittle and had relatively low impact resistance.

*Example II*

Stocks A, B and C having the following formulations were prepared:

| | A (Same as Example I) | B | C |
|---|---|---|---|
| Cross-linked Polystyrene Resin (same as in Example I) | 42.50 | 42.50 | 42.50 |
| Styrene/butadiene Resin (same as in Example I) | 25.50 | 25.50 | 25.50 |
| Un-cross-linked Butadiene/styrene Rubber (same as in Example I) | 16.00 | 32.00 | |
| Cross-linked Butadiene/styrene Rubbery Co-polymer (same as in Example I) | 16.00 | | 32.00 |
| Total | 100.00 | 100.00 | 100.00 |

When mixed and processed in the same way as in Example I the resulting stocks had the following physical properties:

| | A | B | C |
|---|---|---|---|
| Tensile Strength | 3,800 | 3,850 | 3,200. |
| Elongation | 33 | 34 | 8. |
| Rockwell Hardness | 80 | 78 | 80. |
| Heat Distortion Temp | 160 | 160 | 160. |
| Izod Notched Impact | 3.75 | 3.65 | 1.0. |
| Calender Sheet Charactersitics | Very Smooth | Fairly Smooth | Fairly Smooth. |
| Ultraviolet Light Ageing (24 hours) | No Discoloration | No Discoloration | No Discoloration. |
| Extruded Strip 1" wide, ⅛" thick | Very Smooth | Slightly Rough | Very Smooth. |

The three stocks of Example II demonstrate the improved calendering and extruding properties obtained when one-half of the relatively butadiene-styrene rubber copolymer phase of the compositions is cross-linked and the other half is un-cross-linked. The preferred composition, Stock A, produced a smooth calendered or extruded sheet having good physical properties. Stock C which contained only the cross-linked rubbery copolymer produced a fairly smooth calendered or extruded sheet but had a somewhat low impact resistance value. Stock B which contained only the un-cross-linked rubbery copolymer had good physical properties but did not calender or extrude as smoothly as Stock A. It is evident that the use of cross-linked and un-cross-linked rubbery butadiene-styrene copolymers in conjunction with one another gives a far more desirable product than the use of either of these copolymers by itself.

Example III

This example, included for purposes of comparison, is exactly like Example I except that the commercially available polystyrene resin (a benzene-soluble un-cross-linked polymer) known as "Lustrex No. 2500," made by Monsanto Chemical Company, was substituted for the cross-linked polystyrene resin used in Example I. The formulation and data on the resulting stock were as follows:

| | |
|---|---|
| Polystyrene resin ("Lustrex No. 2500") | 42.50 |
| Styrene/butadiene resin (same as in Example I) | 25.50 |
| Un-cross-linked butadiene/styrene rubbery copolymer (same as in Example I) | 16.00 |
| Cross-linked butadiene/styrene rubbery copolymer (same as in Example I) | 16.00 |
| Total | 100.00 |

| | |
|---|---|
| Tensile strength (p. s. i.) | 3000 |
| Elongation (per cent) | 16 |
| Rockwell hardness "R" scale | 78 |
| Heat distortion temp., °F | 158 |
| Izod notched impact | 4.4 |
| Calender sheet characteristics (thickness 0.060 inch) | Quite rough |
| Ultraviolet light ageing (24 hours) | No discoloration |
| Extruded strip—1" wide, 1/8" thick | Rough |

While the composition of Example III had fairly good physical properties, the calendered or extruded sheet was quite rough. The calendered sheets did not approach the desired smoothness for direct drawing into articles.

Example IV

The following formulation was employed in this example, included merely for purposes of comparison:

| | |
|---|---|
| Cross-linked high molecular weight polystyrene resin (same as in Example I) | 42.50 |
| Styrene/butadiene resin (same as in Example I) | 42.50 |
| GR-S X549 (regular GR-S cross-linked with divinylbenzene—available from Rubber Reserve) | 15.00 |
| Total | 100.00 |

Upon processing in the same way as before, this stock had the following physical properties:

| | |
|---|---|
| Tensile strength | 4100 |
| Elongation, per cent | 28 |
| Rockwell hardness "R" scale | 80 |
| Heat distortion temp., °F | 160 |
| Izod notched impact | 5 |
| Calender sheet characteristics | Rough |
| Ultraviolet light ageing (24 hours) | Quite yellow |
| Extruded strip—1" wide, 1/8" thick | Very rough |

In the foregoing examples all compositions were blended either on an open rubber mill or in a Banbury mixer at temperatures of 300–325° F. and the compositions were calendered or extruded at temperatures of 300–350° F. The values for tensile strength, elongation, hardness and impact were determined on test samples which were made by pressing calendered sheets together to obtain specimens 1/8" thick. The plying up for these tests was done at 310° F. under a pressure of 200 p. s. i.

All parts and percentages specified herein are by weight.

Having described my invention, what I claim and desire to secure by Letters Patent is:

1. A new composition of matter comprising from 40 to 50% of a resin which is a copolymer of styrene and from 0.01 to 2.0% by weight of divinylbenzene based on monomeric styrene, from 25 to 30% of a resinous copolymer of from 78 to 95% of styrene and from 22 to 5% of butadiene, and from 25 to 35% of a rubbery copolymer comprising from 35 to 60% of combined butadiene and from 65 to 40% of combined styrene, the percentages of said resin, said resinous copolymer and said rubbery copolymer being by weight based on these three ingredients and totaling 100%.

2. A composition as recited in claim 1 wherein said rubbery copolymer is made up of from 40 to 60% of an un-cross-linked rubbery copolymer containing from 35 to 60% of butadiene and from 65 to 40% of combined styrene, and from 60 to 40% of a rubbery copolymer containing from 35 to 60% of combined butadiene and from 65 to 40% of combined styrene, said last-named copolymer being cross-linked with from 0.01 to 2.0% by weight of divinylbenzene based on monomeric butadiene and styrene.

3. A new composition of matter comprising approximately 42.5% of a resin which is a copolymer of styrene and from 0.01 to 2.0% of divinylbenzene based on monomeric styrene, approximately 25.5% of a resinous copolymer containing approximately 78% of combined styrene and approximately 22% of combined butadiene, said resinous copolymer having an ASTM heat distortion temperature (264 p. s. i.) of at least 140° F., approximately 16% of an un-cross-linked rubbery copolymer containing approximately 40% of combined butadiene and 60% of combined styrene, and approximately 16% of a rubbery copolymer containing approximately 40% of combined butadiene and 60% of combined styrene, said last-named copolymer being cross-linked with approximately 0.3% of divinylbenzene based upon monomeric butadiene and styrene, the percentages of said resin, said resinous copolymer and rubbery copolymers being by weight based on the sum of these four ingredients and totaling 100%.

References Cited in the file of this patent

UNITED STATES PATENTS

| Number | Name | Date |
|---|---|---|
| 2,341,175 | Britton et al. | Feb. 8, 1944 |
| 2,616,864 | Donaldson et al. | Nov. 4, 1952 |
| 2,638,462 | Borders | May 12, 1953 |
| 2,643,987 | Harrison et al. | June 30, 1953 |